United States Patent
Li

(10) Patent No.: US 10,923,047 B2
(45) Date of Patent: Feb. 16, 2021

(54) BACKLIGHT CONSTANT CURRENT DRIVER BOARD AND LIQUID CRYSTAL DISPLAY TELEVISION

(71) Applicant: SHENZHEN CHUANGWEI-RGB ELECTRONIC CO., LTD, Shenzhen (CN)

(72) Inventor: Yawei Li, Shenzhen (CN)

(73) Assignee: SHENZHEN CHUANGWEI-RGB ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 16/464,075

(22) PCT Filed: Mar. 9, 2017

(86) PCT No.: PCT/CN2017/076071
§ 371 (c)(1),
(2) Date: May 24, 2019

(87) PCT Pub. No.: WO2018/098921
PCT Pub. Date: Jun. 7, 2018

(65) Prior Publication Data
US 2019/0385540 A1 Dec. 19, 2019

(30) Foreign Application Priority Data
Nov. 29, 2016 (CN) .......................... 201611072137.3

(51) Int. Cl.
*G09G 3/34* (2006.01)
*G09G 3/36* (2006.01)

(52) U.S. Cl.
CPC ............... *G09G 3/342* (2013.01); *G09G 3/36* (2013.01); *G09G 2320/0626* (2013.01); *G09G 2330/022* (2013.01)

(58) Field of Classification Search
None
See application file for complete search history.

(56) References Cited

U.S. PATENT DOCUMENTS

2013/0120687 A1* 5/2013 Hao ..................... H05B 47/10
349/61
2015/0062483 A1* 3/2015 Zhang .................. G09G 3/342
349/61

(Continued)

FOREIGN PATENT DOCUMENTS

CN 101833929 A 9/2010
CN 201667742 U 12/2010

(Continued)

OTHER PUBLICATIONS

The World Intellectual Property Organization (WIPO) International Search Report for PCT/CN2017/076071 dated Aug. 29, 2017 6 Pages.

*Primary Examiner* — Ifedayo B Iluyomade
(74) *Attorney, Agent, or Firm* — Anova Law Group, PLLC

(57) ABSTRACT

Backlight constant current driver board comprises boost circuit, constant current control circuit, switchover switch circuit, and light strip socket, connects to backlight light strip via light strip socket. Boost circuit boosts input voltage before outputting output voltage and transmits via light strip socket as power supply to backlight light strip. Switchover switch circuit controls, according to PWM signal and power supply voltage, connection or disconnection of current loop between backlight light strip and ground. Constant current control circuit monitors and keeps constant current magnitude of backlight light strip in switchover switch circuit. By switchover switch circuit, during system standby, formation of current loop between backlight light strip and ground is prevented so backlight light strip does not emit light, thus (Continued)

solving problems of screen emitting dim lights when existing LCD television standby or constant current drive control chip not working.

16 Claims, 3 Drawing Sheets

(56) References Cited

U.S. PATENT DOCUMENTS

2015/0294615 A1* 10/2015 Zhang .................... G09G 3/003
                                                         345/212
2016/0044757 A1   2/2016 Koo

FOREIGN PATENT DOCUMENTS

| CN | 103280190 A | 9/2013 |
| CN | 103327696 A | 9/2013 |
| CN | 103440848 A | 12/2013 |
| CN | 105322803 A | 2/2016 |
| CN | 106448577 A | 2/2017 |

* cited by examiner

BACKLIGHT CONSTANT CURRENT DRIVER BOARD AND LIQUID CRYSTAL DISPLAY TELEVISION

CROSS-REFERENCES TO RELATED APPLICATIONS

This application is a national stage application of PCT Patent Application No. PCT/CN 2017/076071, filed on Mar. 9, 2017, which claims priority to Chinese Patent Application No. 201611072137.3, filed on Nov. 29, 2016, the content of all of which is incorporated herein by reference.

FIELD OF THE INVENTION

The present invention relates to the field of display technology, and more particularly, to a backlight constant current driver board and a liquid crystal display television.

BACKGROUND

In a micro-profit era, win by a low cost is no longer a slogan, while it has been fully implemented in an actual work. As large as an LCD (liquid crystal display) screen, as small as a component, with a constant cost optimization, a high cost-performance has become an eternal theme in a power development. An ordinary package in a development of a constant current drive control chip comprises: QFP (Quad Flat Package)-44, SOP (Small Outline Package)-32, SOP-24, SOP-16, SOP-8, TSOP (Thin Small Outline Package)-6, and more. A package of a chip has a big relationship with a price thereof, the smaller the package is, the less a plurality of pins are, and the less a price is.

Following a development of a screen of a TV audio-visual product, a backlight technology has gradually matured, and a backlight LED light is in a constant optimization. In a small or a medium-sized LCD TV, a chip of a backlight driver circuit is often packaged in SOP-8 or TSOP-6. Although there is a certain advantage in the price, there is also a plurality of shortcomings in the performance, including an operating frequency not adjustable, no functions for soft start and more. Due to a relatively less pin number, there is no MOSFET integrated in the chip, shown as FIG. 1. It is supposed that an input voltage Vin is 24V, which is stored in an inductor L, rectified by a diode D, filtered by a capacitor C sequentially, before being output to a backlight LED light strip through a light strip socket N (suppose there are 8 LED lights, and a VF value to each LED light is 3.3V, a backlight voltage is 26.4V). In such a way, the input voltage Vin is close to an output voltage Vout, which has a relatively smaller duty ratio in a boost circuit Boost thereof (which is composed by a constant current drive control chip U and a plurality of peripheral circuits, an ENA signal is applied to controlling the constant current drive control chip U start, a PWM signal is applied to controlling a size of the output voltage): a formula to calculate the duty ratio is: Duty=1−(Vin/Vout). When a system is standby or the constant current drive control chip U is not working, a loop is formed between the output voltage Vout and a ground, there will be a plurality of small currents pass the backlight LED light strip, causing the screen to appear a dim light, which makes the LED light decay, and also effects a display effect.

Therefore, the current technology needs to be improved and developed.

BRIEF SUMMARY OF THE DISCLOSURE

According to the above described defects, the purpose of the present invention is providing a backlight constant current driver board and a liquid crystal display television, to solve a problem in the prior art that, when a liquid crystal display television is in a standby mode or when a constant current drive control chip is not working, a screen of the television appears a dim light.

In order to achieve the above mentioned goals, the technical solution of the present invention to solve the technical problems is as follows:

a backlight constant current driver board, wherein, comprises a boost circuit, a constant current control circuit, a switchover switch circuit, and a light strip socket; the backlight constant current driver board connects to a backlight light strip via the light strip socket;

the boost circuit boosts an input voltage before outputting an output voltage and transmitting to the backlight light strip via the light strip socket as a power supply; the switchover switch circuit controls a connection or disconnection of a loop between a current in the backlight light strip and a ground, according to a PWM signal and a power supply voltage; the constant current control circuit monitors and keeps constant a magnitude of the current in the backlight light strip in the switchover switch circuit, according to the PWM signal and an ENA signal.

The backlight constant current driver board, wherein the switchover switch circuit is turned on when the PWM signal is at a high level, forming a loop between the current in the backlight light strip and the ground, achieving a normal lighting of the backlight light strip; and the switchover switch circuit interrupts when the PWM signal is at a low level, causing the current having no loop to the ground, and the backlight light strip going out.

The backlight constant current driver board, wherein the switchover switch circuit comprises a control unit and a switch unit;

the control unit controls whether converting the power supply voltage into a turn-on threshold voltage before outputting according to a high or low level of the PWM signal; the switch unit controls an output state of the current of the backlight light strip according to an output state of the turn-on threshold voltage.

The backlight constant current driver board, wherein the control unit comprises a first triode, a second triode, a first resistor and a second resistor;

a base of the first triode connects to one end of the first resistor, another end of the first resistor connects to a main board, an emitter of the first triode connects to the ground, a collector of the first triode connects to one end of the second resistor and a base of the second triode, an emitter of the second triode connects to another end of the second resistor and a power board, a collector of the second triode connects to the switch unit.

The backlight constant current driver board, wherein the control unit further comprises a third resistor, a fourth resistor and a fifth resistor;

one end of the third resistor connects to the collector of the first triode, another end of the third resistor connects to the base of the second triode and one end of the second resistor, one end of the forth resistor connects to the emitter of the second triode and another end of the second resistor, another end of the forth resistor connects to the power board, one end of the fifth resistor connects to the collector of the second triode, another end of the fifth resistor connects to the switch unit.

The backlight constant current driver board, wherein, the switch unit comprises an MOS transistor and a sixth resistor;

a gate of the MOS transistor connects to one end of the sixth resistor and the collector of the second triode, a source of the MOS transistor connects to another end of the sixth resistor and the constant current control circuit, a drain of the MOS transistor connects to a fifth pin and a sixth pin of the light strip socket; both the fifth pin and the sixth pin of the light strip socket are connecting to a negative end of the backlight light strip.

The backlight constant current driver board, wherein the boost circuit comprises a fuse, an inductor, a switch MOS transistor, a first capacitor, a second capacitor, a seventh resistor, an eighth resistor, a ninth resistor, a first diode and a second diode;

one end of the fuse connects to the power board; another end of the fuse connects to the constant current control circuit, one end of the first capacitor and one end of the inductor, another end of the first capacitor gets grounded, another end of the inductor connects to a drain of the switch MOS transistor and a positive end of the first diode; a negative end of the first diode connects to one end of the second capacitor, one end of the eighth resistor and a first pin and a second pin of the light strip socket; another end of the eighth resistor connects to the constant current control circuit, and gets grounded via the ninth resistor; another end of the second capacitor gets grounded, a gate of the switch MOS transistor connects to a positive end of the second diode, a negative end of the second diode connects to the constant current control circuit; a source of the switch MOS transistor connects to the constant current control circuit via the seventh resistor, both the first pin and the second pin of the light strip socket connect to a positive end of the backlight light strip.

The backlight constant current driver board, wherein, the constant current control circuit comprises a constant current drive control chip, a tenth resistor, an eleventh resistor and a twelfth resistor;

a VCC pin of the constant current drive control chip connects to another end of the fuse, an OUT pin of the constant current drive control chip connects to the negative end of the second diode, a CS pin of the constant current drive control chip connects to the source of the switch MOS transistor via the seventh resistor; a DIM/EN pin of the constant current drive control chip connects to the main board; an OVP pin of the constant current drive control chip connects to another end of the eighth resistor, an FB pin of the constant current drive control chip connects to one end of the tenth resistor; one end of the twelfth resistor connects to a source of the MOS transistor, one end of the tenth resistor, and one end of the eleventh resistor; the other ends of the tenth resistor, the eleventh resistor, and the twelfth resistor are all getting grounded.

A liquid crystal display television, having a circuit board integrated, wherein the circuit board has a power board, a main board and a backlight light strip integrated, and the circuit board further integrates the backlight constant current driver board;

the power board outputs the power supply voltage and the input voltage to the backlight constant current driver board to supply power, the main board outputs the PWM signal and the ENA signal to the backlight constant current driver board; the backlight constant current driver board boosts the input voltage, and outputs the output voltage to the backlight light strip for power, monitors and keeps constant a current in the backlight light strip according to the PWM signal and the ENA signal, and further controls on and off of the loop between the current in the backlight light strip and the ground according to the PWM signal and the power supply voltage.

Comparing to the prior art, the present invention provides a backlight constant current driver board and a liquid crystal display television, wherein the backlight constant current driver board connects to a backlight light strip via a light strip socket, boosts an input voltage via a boost circuit before outputting an output voltage, and transmitting to the backlight light strip for power via a light strip socket; a switchover switch circuit controls on and off of a loop between a current in the backlight light strip and the ground according to a PWM signal and a supply voltage; a constant current control circuit monitors and keeps constant a magnitude of the current in the backlight light strip of the switchover switch circuit, according to the PWM signal and an ENA signal. By the switchover switch circuit, when the system is in standby, there is no loop formed between the current in the backlight light strip and the ground, thus the backlight light strip emits no light; therefore, a problem in the prior art that, when a liquid crystal display television is in a standby mode or when a constant current drive control chip is not working, a screen of the television appears a dim light, is thereby solved.

DETAILED DESCRIPTION OF EMBODIMENTS

The present invention provides a backlight constant current driver board and a liquid crystal display television, applied to processing a backlight light strip dim light in a field of a liquid crystal display television, including an LCD (Liquid Crystal Display), an LED-TV (a liquid crystal television using a plurality of LED lights as a backlight material), and it may further be applied to a plurality of related fields including a monitor, an electrical education, a rear projection, a plasma and more. Through adding a switchover switch circuit, when a PWM signal is at a high level, the switchover switch circuit is turned on, making the backlight light strip light on normally; and when the PWM signal is at a low level, the switchover switch circuit is turned off, making the backlight light strip light off. Through synchronizing with the PWM signal and the boost circuit, a problem of a screen dim light is solved. In order to make the purpose, technical solution and the advantages of the present invention clearer and more explicit, further detailed descriptions of the present invention are stated here, referencing to the attached drawings and some preferred embodiments of the present invention. It should be understood that the detailed embodiments of the invention described here are used to explain the present invention only, instead of limiting the present invention.

Figure 1:
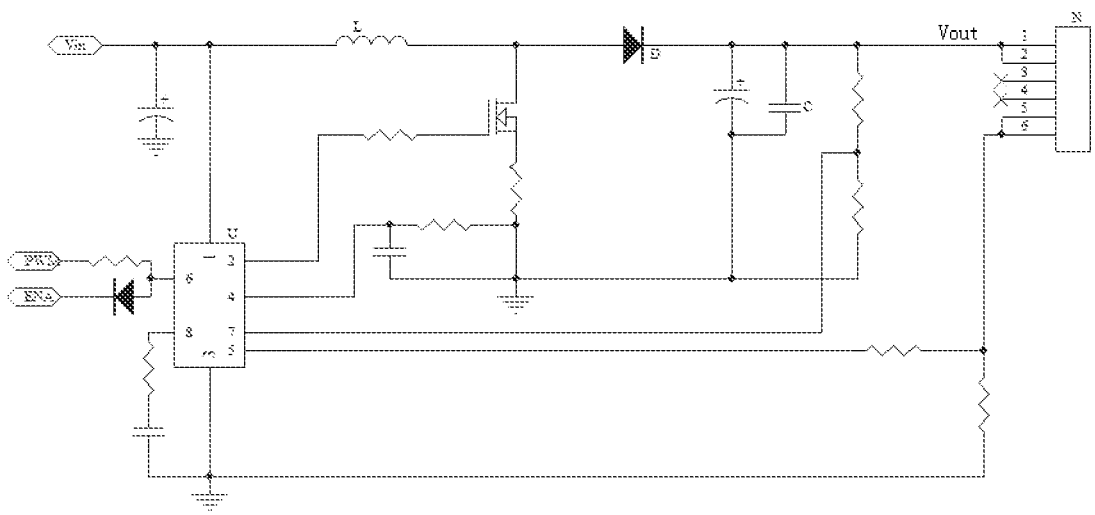
FIG. 1 illustrates a topological structural diagram of a constant current drive control chip adopting an SOP-8 package in a backlight constant current drive circuit in the prior art.
Figure 2:
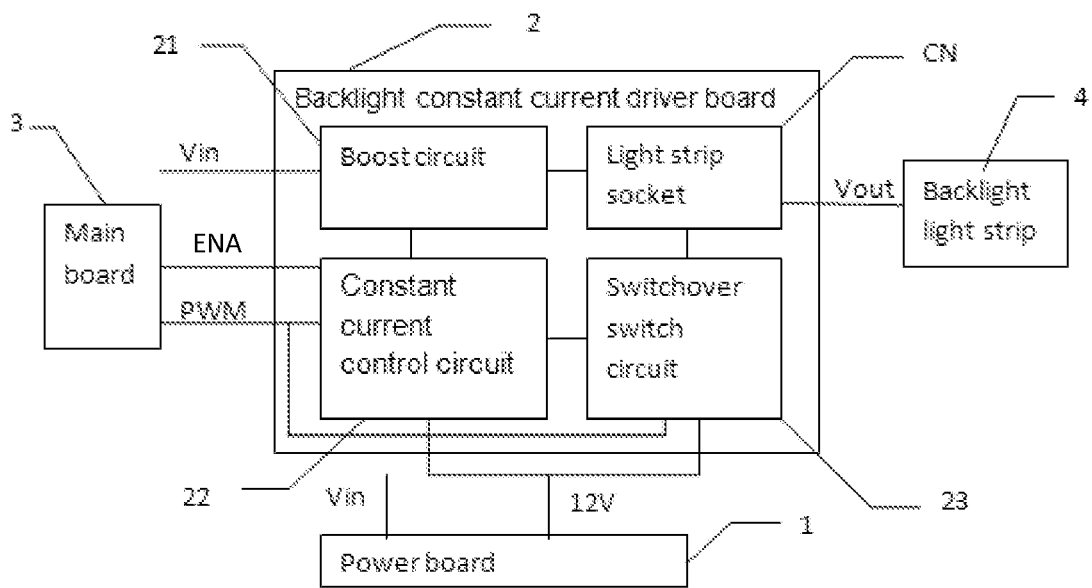
FIG. 2 illustrates a structural block diagram of the liquid crystal display television in the present invention.

Shown as FIG. 2, the liquid crystal display television solving the backlight light strip dim light as provided in the present embodiment, has a circuit board arranged inside, wherein the circuit board has integrated a power board 1, a backlight constant current driver board 2, a main board 3 and a backlight light strip 4. The power board I outputs a power supply voltage of 12V and an input voltage Vin of 24V to the backlight constant current driver board 2 for power. The main board 3 outputs a PWM signal and an ENA signal to the backlight constant current driver board 2. The backlight constant current driver board 2 boosts the input voltage Vin before outputting an output voltage Vout to the backlight light strip 4 for power, monitors and keeps constant a current in the backlight light strip according to the PWM signal and the ENA signal, and further controls on and off of the loop between the current in the backlight light strip and the ground according to the PWM signal and the power supply voltage of 12V.

The backlight constant current driver board 2 has a boost circuit 21, a constant current control circuit 22, a switchover switch circuit 23, and a light strip socket CN integrated. The backlight constant current driver board 2 connects to a backlight light strip 4 via the light strip socket CN. The boost circuit 21 boosts the input voltage Vin before outputting an output voltage Vout and transmitting to the backlight light strip 4 via the light strip socket CN for power. The switchover switch circuit 23 controls a connection or disconnection of a current loop between the current in the backlight light strip 4 and a ground, according to the PWM signal in a high or low level and the power supply voltage of 12V. The constant current control circuit 22 monitors and keeps constant a magnitude of the current of the backlight light strip 4 in the switchover switch circuit 23, according to the PWM signal and the ENA signal.

Wherein, the switchover switch circuit 23 is turned on when the PWM signal is at a high level, forming a loop between the current in the backlight light strip 4 and the ground, achieving a normal lighting of the backlight light strip 4; and the switchover switch circuit 23 interrupts when the PWM signal is at a low level, causing the current having no loop to the ground, and the backlight light strip going out, thus the problem of the backlight light strip 4 dim light is solved.

Figure 3:
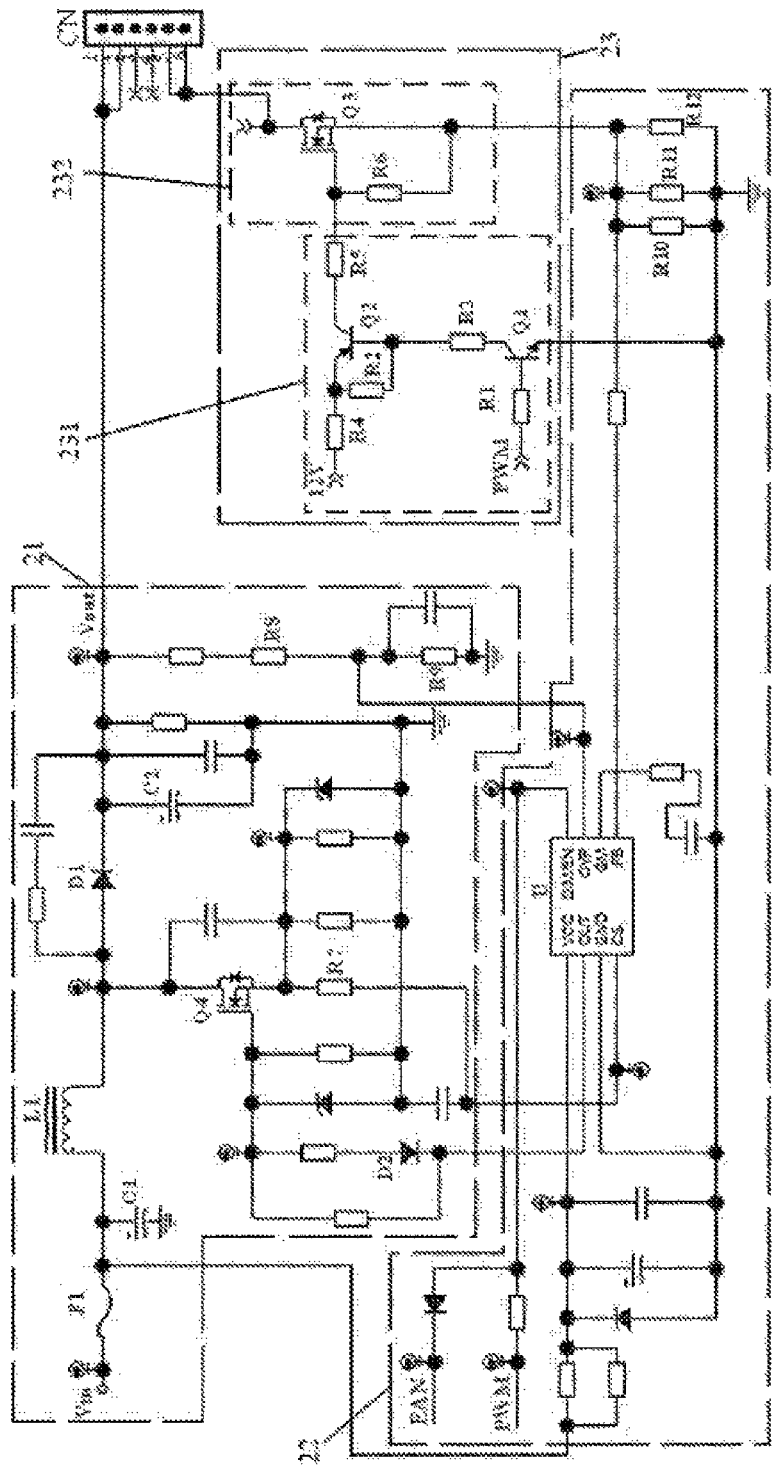
FIG. 3 illustrates a circuit diagram of the backlight constant current driver board.

Referencing together to the FIG. 3, the switchover switch circuit 23 comprises a control unit 231 and a switch unit 232; the control unit 231 controls whether converting the power supply voltage into a turn-on threshold voltage before outputting, according to a high or low level of the PWM signal. The switch unit 232 controls an output state of the current in the backlight light strip 4 according to an output state of the turn-on threshold voltage.

The control unit 231 comprises a first triode Q1, a second triode Q2, a first resistor R1 and a second resistor R2; a base electrode of the first triode Q1 connects to one end of the first resistor R1, another end of the first resistor R1 connects to a main board, an emitter of the first triode Q1 connects to the ground, a collector of the first triode Q1 connects to one end of the second resistor R2 and a base of the second triode Q2, an emitter of the second triode Q2 connects to another end of the second resistor R2 and a power board, a collector of the second triode Q2 connects to the switch unit 232.

Wherein, the first triode Q1 is an NPN triode, the second triode Q2 is a PNP triode, a resistance of the first resistor R1 is 10 KΩ, a resistance of the second resistor R2 is 22 KΩ. The power supply voltage of 12V output by the power board is transmitted to the emitter of the second triode Q2, the PWM signal output by the main board is transmitted to another end of the second resistor R2. When the PWM signal is at a high level, the first triode Q1 turns on, making the second triode Q2 turn on, and output a turn-on threshold voltage to the switch unit 232. When the PWM signal is at a low level, the first triode Q1 turns off, making the second triode Q2 turn off, and no turn-on threshold voltage is output.

In a further embodiment, the control unit 231 further comprises a third resistor R3, a fourth resistor R4 and a fifth resistor R5; one end of the third resistor R3 connects to the collector of the first triode Q1, another end of the third resistor R3 connects to the base of the second triode Q2 and one end of the second resistor R2, one end of the forth resistor R4 connects to the emitter of the second triode Q2 and another end of the second resistor R2, another end of the forth resistor R4 connects to the power board. one end of the fifth resistor R5 connects to the collector of the second triode Q2, another end of the fifth resistor R5 connects to the switch unit 232.

Wherein, the third resistor R3 is applied to protecting the second triode Q2 and pulling down. The forth resistor R4 is applied to current limiting and protecting the second triode Q2, and further combines with the second resistor R2 before providing a bias voltage for the second triode Q2. The fifth resistor R5 is applied to current limiting.

The switch unit 232 comprises an MOS transistor Q3 and a sixth resistor R6; a gate of the MOS transistor Q3 connects to one end of the sixth resistor R6 and the collector of the second triode Q2 (or another end of the fifth resistor R5), a source of the MOS transistor Q3 connects to another end of the sixth resistor R6 and the constant current control circuit, a drain of the MOS transistor Q3 connects to a fifth pin and a sixth pin of the light strip socket CN. Both the fifth pin and the sixth pin of the light strip socket CN are connecting to a negative end of the backlight light strip 4.

Wherein, the MOS transistor Q3 is an NMOS transistor, a resistance of the sixth resistor R6 is 10 KΩ. The gate of the MOS transistor Q3 turns on when a high level is input, outputting the current in the backlight light strip to the constant current control circuit before forming a ground circuit. The gate of the MOS transistor Q3 is cut off when a low level is input, and no current in the backlight light strip will be output.

In the present embodiment, the boost circuit 21 comprises a fuse F1, an inductor L1, a switch MOS transistor Q4, a first capacitor C1, a second capacitor C2, a seventh resistor R7, an eighth resistor R8, a ninth resistor R9, a first diode D1 and a second diode D2; one end of the fuse F1 connects to the power board; another end of the fuse F1 connects to the constant current control circuit, one end of the first capacitor C1 and one end of the inductor L1, another end of the first capacitor C1 gets grounded, another end of the inductor L1 connects to a drain of the switch MOS transistor Q4 and a positive end of the first diode D1; a negative end of the first diode D1 connects to one end of the second capacitor C2, one end of the eighth resistor R8 and a first pin and a second pin of the light strip socket CN; another end of the eighth resistor R8 connects to the constant current control circuit, and gets grounded via the ninth resistor R9; another end of the second capacitor C2 gets grounded, a gate of the switch MOS transistor Q4 connects to a positive end of the second diode D2, a negative end of the second diode D2 connects to the constant current control circuit; a source of the switch MOS transistor Q4 connects to the constant current control circuit via the seventh resistor R7, both the first pin and the second pin of the light strip socket CN connect to a positive end of the backlight light strip 4.

The constant current control circuit 22 comprises a constant current drive control chip U with a modal of PF7906BS, a tenth resistor R10, an eleventh resistor R11 and a twelfth resistor R12; a VCC pin of the constant current drive control chip U connects to another end of the fuse F1, an OUT pin of the constant current drive control chip U connects to the negative end of the second diode D2, a CS pin of the constant current drive control chip U connects to the source of the switch MOS transistor Q4 via the seventh resistor R7; a DIM/EN pin of the constant current drive control chip U connects to the main board; an OVP pin of the constant current drive control chip U connects to another end of the eighth resistor R8, an FB pin of the constant current drive control chip U connects to one end of the tenth resistor R10; one end of the twelfth resistor R12 connects to a source of the MOS transistor Q3, one end of the tenth resistor R10, and one end of the eleventh resistor R11; the other ends of the tenth resistor R10, the eleventh resistor R11, and the twelfth resistor R12 are all getting grounded.

Continue referencing to FIG. 2 and FIG. 3, a work principle of the backlight constant current driver board 2 is:

After connecting to an AC power, the power board outputs a power supply voltage of 12V to the backlight constant current driver board for power, the main board provides the ENA signal and the PWM signal to the backlight constant current driver board, the constant current driver board starts working.

The input voltage Vin of 24V flows in turn over the fuse F1, the first capacitor C1 for filtration, the inductor L1 for power storage, the first diode D1 for rectifying, and the second capacitor C2 for filtration, before outputting the output voltage Vout to the positive end of the backlight light strip for power, through a first pin and a second pin of the light strip socket CN. If there is no switchover switch circuit as in the prior art, then the fifth pin and the sixth pin of the light strip socket CN connect directly to one end of the twelfth resistor R12, a size of the current in the backlight light strip 4 is set by the tenth resistor R10, the eleventh resistor R11 and the twelfth resistor R12, before feeding back to the constant current drive control chip U. The constant current drive control chip U changes a magnitude of the output voltage Vout through adjusting an on or off state of the switch MOS transistor Q4, to control the current in the backlight light strip and make the current constant and stable. However, since the input voltage is 24V, and the voltage of the backlight light strip is 26.2V, it has a duty cycle of 9%, and the main board is in standby, no PWM signal or ENA signal is provided, the constant current driver control chip U is not working. And the positive end of the backlight light strip has 24V, thus there will be a tiny current flowing over the backlight light strip, making the LED lights slightly on thus the screen slightly on.

However, in the present embodiment, after adding the switchover switch circuit, when the liquid crystal display television is working normally, the PWM signal (pulse control) output by the main board 3 is input into the backlight constant current driver board 2 in two paths. While one path is applied to controlling the constant current drive control chip U, another path is applied to controlling the switchover switch circuit. When the PWM signal is at a high level, a current Ib of the first triode Q1 is provided through the first resistor R1, turning it on for working. The emitter of the first triode Q1 is pulled down to the ground. The power supply voltage of 12V provides the bias voltage to the second triode Q2 through the fourth resistor R4 and the second resistor R2. When the first triode Q1 is turned on, the bias voltage provides a current Ib to the second triode Q2 through the third resistor R3, the second triode Q2 is turned on for work, there is a voltage of 11.4V in the collector thereof. The voltage is transmitted before providing a turn-on threshold voltage to the gate of the MOS transistor Q3 via the fifth resistor R5, making the MOS tube Q3 turn on and work, the current in the backlight light strip flows over the MOS transistor Q3, the tenth resistor R10, the eleventh resistor R11, the twelfth resistor R12, before getting grounded, and forming a loop, the backlight light strip gives out light. Thus the switchover switch circuit achieves an action of turning on.

When the system is in standby, the PWM signal is at a low level, the first triode Q1 is turned off, the second triode Q2 has no current Ib and is not working, the 12V can not be provided to the MOS transistor Q3 for providing the turn-on threshold voltage, and the current in the backlight light strip can not flow over the MOS transistor Q3, the backlight light strip will not give out light. Thus the switchover switch circuit achieves an action of turning off.

Figure 4:
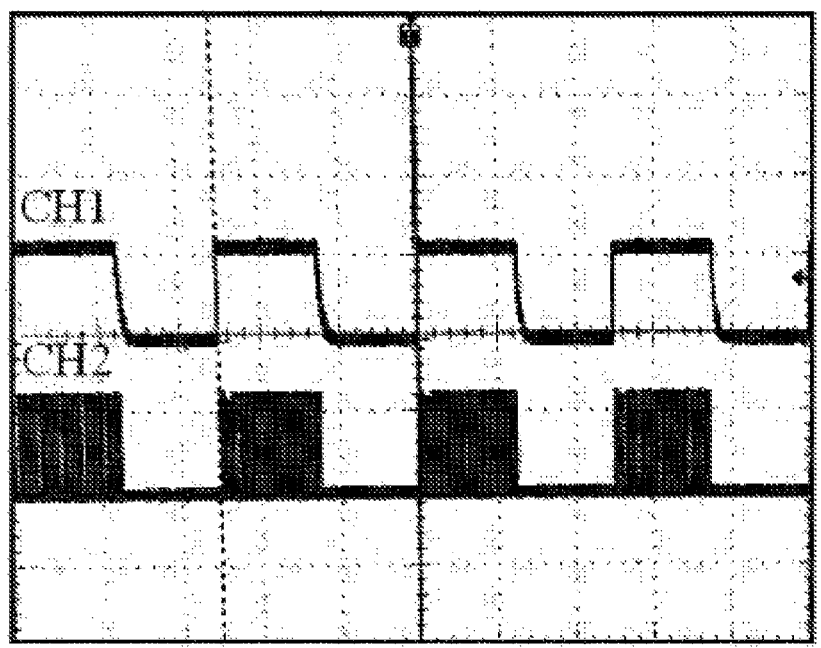
FIG. 4 illustrates a waveform diagram of a PWM signal and a gate control signal of a switch MOS transistor in the present invention.

Due to the switchover switch circuit and the constant current drive control chip U are sharing a path of the PWM signal, switching the switchover switch circuit and switching the boost circuit is totally synchronized, that is, when the MOS transistor Q3 in the switchover switch circuit is turned on, the switch MOS transistor Q4 in the boost circuit is also turned on. When the MOS transistor Q3 in the switchover switch circuit is turned off, the switch MOS transistor Q4 in the boost circuit is also turned off, achieving a synchronizing action. As shown in the waveform in the FIG. 4, CH1 is the PWM signal, having a work frequency of 1 KHz. CH2 is a gate control signal of the switch MOS transistor Q4 in the boost circuit, having a work frequency of 100 KHz. From the FIG. 4, it can be seen that, the PWM signal is synchronizing with the gate control signal of the switch MOS transistor Q4, that is, the MOS transistor Q3 is turned on and off at a same time when the switch MOS transistor Q4 is turned on.

All above, the present invention provides a backlight constant current driver board and a liquid crystal display television, through adding a switchover switch circuit, controlling and synchronizing the switchover switch circuit with the PWM signal and the boost circuit, turning on the switchover switch circuit when the PWM signal is high, forming a loop between the backlight current and the ground, and controlling the backlight light strip light on normally; and in a standby state, the PWM signal is at a low level, the switchover switch circuit is turned off, making the backlight current no touching the ground, thus totally tuning the backlight light strip off; being able to effectively solve the problem of the backlight light strip dim light. The switchover switch circuit has a simple structure, a low cost and a simple process.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

What is claimed is:

1. A backlight constant current driver board, wherein, comprises a boost circuit, a constant current control circuit, a switchover switch circuit, and a light strip socket; the backlight constant current driver board connects to a backlight light strip of a display via the light strip socket; the boost circuit boosts an input voltage before outputting an output voltage and transmitting to the backlight light strip via the light strip socket as a power supply; the switchover switch circuit controls a connection or disconnection of a loop between a current in the backlight light strip and a ground, according to a PWM signal and a power supply voltage; the constant current control circuit monitors and keeps constant a magnitude of the current in the backlight light strip in the switchover switch circuit, according to the PWM signal and an ENA signal, the switchover switch circuit comprises a control unit and a switch unit; the control unit controls whether converting the power supply voltage into a turn-on threshold voltage before outputting according to a high or low level of the PWM signal; and the switch unit controls an output state of the current of the backlight light strip according to an output state of the turn-on threshold voltage.

2. The backlight constant current driver board according to claim 1, wherein, the switchover switch circuit is turned on when the PWM signal is at a high level, forming a loop between the current in the backlight light strip and the ground, achieving a normal lighting of the backlight light strip; and the switchover switch circuit interrupts when the PWM signal is at a low level, causing the current having no loop to the ground, and the backlight light strip going out.

3. The backlight constant current driver board according to claim 1, wherein, the control unit comprises a first triode, a second triode, a first resistor and a second resistor;
a base of the first triode connects to one end of the first resistor, another end of the first resistor connects to a main board, an emitter of the first triode connects to the ground, a collector of the first triode connects to one end of the second resistor and a base of the second triode, an emitter of the second triode connects to another end of the second resistor and a power board, a collector of the second triode connects to the switch unit.

4. The backlight constant current driver board according to claim 3, wherein, the control unit further comprises a third resistor, a fourth resistor and a fifth resistor;
one end of the third resistor connects to the collector of the first triode, another end of the third resistor connects to the base of the second triode and one end of the second resistor, one end of the forth resistor connects to the emitter of the second triode and another end of the second resistor, another end of the forth resistor connects to the power board, one end of the fifth resistor connects to the collector of the second triode, another end of the fifth resistor connects to the switch unit.

5. The backlight constant current driver board according to claim 3, wherein, the switch unit comprises an MOS transistor and a sixth resistor;
a gate of the MOS transistor connects to one end of the sixth resistor and the collector of the second triode, a source of the MOS transistor connects to another end of the sixth resistor and the constant current control circuit, a drain of the MOS transistor connects to a fifth pin and a sixth pin of the light strip socket; both the fifth pin and the sixth pin of the light strip socket are connecting to a negative end of the backlight light strip.

6. The backlight constant current driver board according to claim 5, wherein, the boost circuit comprises a fuse, an inductor, a switch MOS transistor, a first capacitor, a second capacitor, a seventh resistor, an eighth resistor, a ninth resistor, a first diode and a second diode;
one end of the fuse connects to the power board; another end of the fuse connects to the constant current control circuit, one end of the first capacitor and one end of the inductor, another end of the first capacitor gets grounded, another end of the inductor connects to a drain of the switch MOS transistor and a positive end of the first diode; a negative end of the first diode connects to one end of the second capacitor, one end of the eighth resistor and a first pin and a second pin of the light strip socket; another end of the eighth resistor connects to the constant current control circuit, and gets grounded via the ninth resistor; another end of the second capacitor gets grounded, a gate of the switch MOS transistor connects to a positive end of the second diode, a negative end of the second diode connects to the constant current control circuit;
a source of the switch MOS transistor connects to the constant current control circuit via the seventh resistor, both the first pin and the second pin of the light strip socket connect to a positive end of the backlight light strip.

7. The backlight constant current driver board according to claim 6, wherein, the constant current control circuit comprises a constant current drive control chip, a tenth resistor, an eleventh resistor and a twelfth resistor;
a VCC pin of the constant current drive control chip connects to another end of the fuse, an OUT pin of the constant current drive control chip connects to the negative end of the second diode, a CS pin of the constant current drive control chip connects to the source of the switch MOS transistor via the seventh resistor; a DIM/EN pin of the constant current drive control chip connects to the main board; an OVP pin of the constant current drive control chip connects to another end of the eighth resistor, an FB pin of the constant current drive control chip connects to one end of the tenth resistor; one end of the twelfth resistor connects to a source of the MOS transistor, one end of the tenth resistor, and one end of the eleventh resistor; the other ends of the tenth resistor, the eleventh resistor, and the twelfth resistor are all getting grounded.

8. A liquid crystal display television, having a circuit board integrated, the circuit board has a power board, a main board and a backlight light strip integrated, wherein the circuit board further integrates a backlight constant current driver board; the power board outputs a power supply voltage and an input voltage to the backlight constant current driver board to supply power, the main board outputs a PWM signal and an ENA signal to the backlight constant current driver board; the backlight constant current driver board boosts the input voltage, and outputs an output voltage to the backlight light strip for power, monitors and keeps constant a current in the backlight light strip according to the PWM signal and the ENA signal, and further controls a connection or disconnection of a loop between the current in the backlight light strip and the ground according to the PWM signal and the power supply voltage; the backlight constant current driver board comprises a boost circuit, a constant current control circuit, a switchover switch circuit, and a light strip socket, the backlight constant current driver board connects to the backlight light strip via the light strip socket; the boost circuit boosts the input voltage before outputting the output voltage and transmitting to the backlight light strip via the light strip socket as a power supply; the switchover switch circuit controls the connection or disconnection of the loop between the current in the backlight light strip and the ground, according to the PWM signal and the power supply voltage; the constant current control circuit monitors and keeps constant a magnitude of the current in the backlight light strip in the switchover switch circuit, according to the PWM signal and the ENA signal;

the switchover switch circuit comprises a control unit and a switch unit; the control unit controls whether converting the power supply voltage into a turn-on threshold voltage before outputting according to a high or low level of the PWM signal; and the switch unit controls an output state of the current of the backlight light strip according to an output state of the turn on threshold voltage.

9. The liquid crystal display television according to claim 8, wherein the switchover switch circuit is turned on when the PWM signal is at a high level, forming a loop between the current in the backlight light strip and the ground, achieving a normal lighting of the backlight light strip; and the switchover switch circuit interrupts when the PWM signal is at a low level, causing the current having no loop to the ground, and the backlight light strip going out.

10. The liquid crystal display television according to claim 8, wherein the control unit comprises a first triode, a second triode, a first resistor and a second resistor;
a base of the first triode connects to one end of the first resistor, another end of the first resistor connects to a main board, an emitter of the first triode connects to the ground, a collector of the first triode connects to one end of the second resistor and a base of the second triode, an emitter of the second triode connects to another end of the second resistor and a power board, a collector of the second triode connects to the switch unit.

11. The liquid crystal display television according to claim 10, wherein the control unit further comprises a third resistor, a fourth resistor and a fifth resistor;
one end of the third resistor connects to the collector of the first triode, another end of the third resistor connects to the base of the second triode and one end of the second resistor, one end of the forth resistor connects to the emitter of the second triode and another end of the second resistor, another end of the forth resistor connects to the power board, one end of the fifth resistor connects to the collector of the second triode, another end of the fifth resistor connects to the switch unit.

12. The liquid crystal display television according to claim 10, wherein the switch unit comprises an MOS transistor and a sixth resistor;
a gate of the MOS transistor connects to one end of the sixth resistor and the collector of the second triode, a source of the MOS transistor connects to another end of the sixth resistor and the constant current control circuit, a drain of the MOS transistor connects to a fifth pin and a sixth pin of the light strip socket; both the fifth pin and the sixth pin of the light strip socket are connecting to a negative end of the backlight light strip.

13. The liquid crystal display television according to claim 12, wherein the boost circuit comprises a fuse, an inductor, a switch MOS transistor, a first capacitor, a second capacitor, a seventh resistor, an eighth resistor, a ninth resistor, a first diode and a second diode;
one end of the fuse connects to the power board; another end of the fuse connects to the constant current control circuit, one end of the first capacitor and one end of the inductor, another end of the first capacitor gets grounded, another end of the inductor connects to a drain of the switch MOS transistor and a positive end of the first diode; a negative end of the first diode connects to one end of the second capacitor, one end of the eighth resistor and a first pin and a second pin of the light strip socket; another end of the eighth resistor connects to the constant current control circuit, and gets grounded via the ninth resistor; another end of the second capacitor gets grounded, a gate of the switch MOS transistor connects to a positive end of the second diode, a negative end of the second diode connects to the constant current control circuit;
a source of the switch MOS transistor connects to the constant current control circuit via the seventh resistor, both the first pin and the second pin of the light strip socket connect to a positive end of the backlight light strip.

14. The liquid crystal display television according to claim 13, wherein the constant current control circuit comprises a constant current drive control chip, a tenth resistor, an eleventh resistor and a twelfth resistor;
a VCC pin of the constant current drive control chip connects to another end of the fuse, an OUT pin of the constant current drive control chip connects to the negative end of the second diode, a CS pin of the constant current drive control chip connects to the source of the switch MOS transistor via the seventh resistor; a DIM/EN pin of the constant current drive control chip connects to the main board; an OVP pin of the constant current drive control chip connects to another end of the eighth resistor, an FB pin of the constant current drive control chip connects to one end of the tenth resistor; one end of the twelfth resistor connects to the source of the MOS transistor, one end of the tenth resistor, and one end of the eleventh resistor; the other ends of the tenth resistor, the eleventh resistor, and the twelfth resistor are all getting grounded.

15. The backlight constant current driver board according to claim 2, wherein, the switchover switch circuit comprises a control unit and a switch unit;
the control unit controls whether converting the power supply voltage into a turn-on threshold voltage before outputting according to a high or low level of the PWM signal; the switch unit controls an output state of the current of the backlight light strip according to an output state of the turn-on threshold voltage.

16. The liquid crystal display television according to claim 9 wherein the switchover switch circuit comprises a control unit and a switch unit; the control unit controls whether converting the power supply voltage into a turn-on threshold voltage before outputting according to a high or low level of the PWM signal; the switch unit controls an output state of the current of the backlight light strip according to an output state of the turn-on threshold voltage.

* * * * *